May 13, 1924.                                                1,493,912
S. J. WHITE ET AL
COMBINATION HANDLE AND RUNNER ATTACHMENT FOR BABY CARRIAGES
Filed Jan. 22, 1923          2 Sheets-Sheet 1

Inventors,
Stephen J. White,
Victor W. Hunter,
by Geyer & Popp
Attorneys.

May 13, 1924.
S. J. WHITE ET AL
1,493,912
COMBINATION HANDLE AND RUNNER ATTACHMENT FOR BABY CARRIAGES
Filed Jan. 22, 1923    2 Sheets-Sheet 2
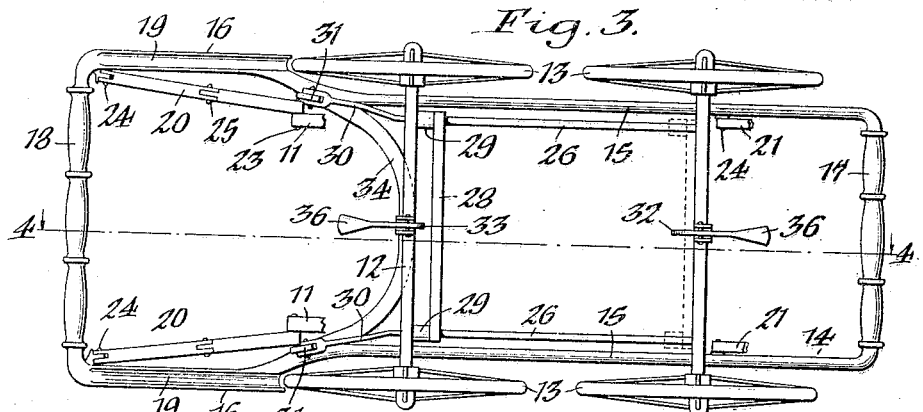
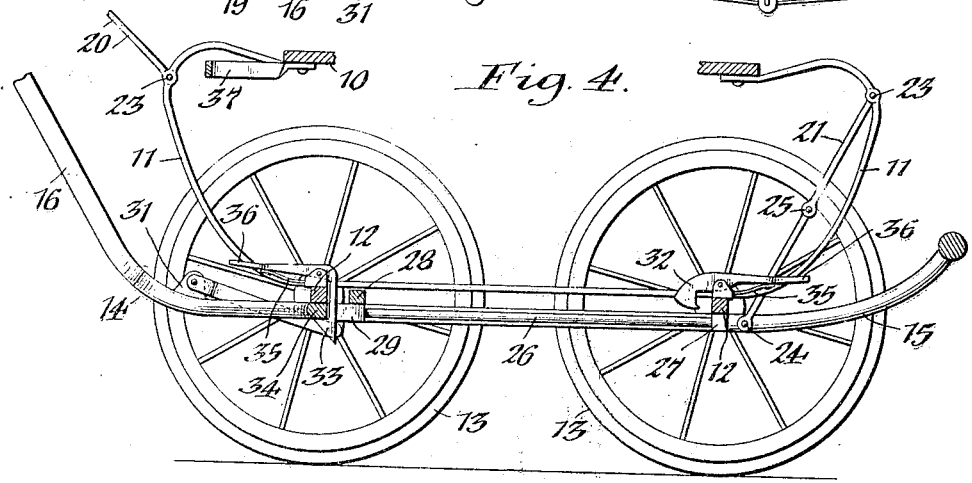
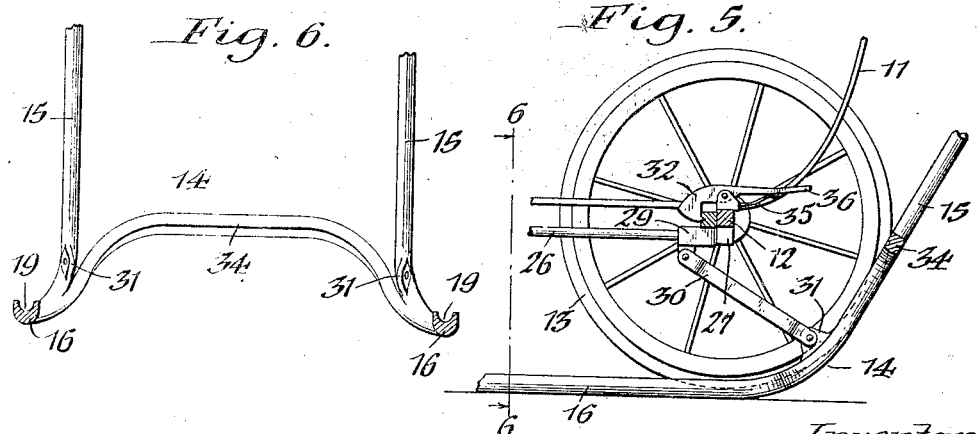

Patented May 13, 1924.

1,493,912

UNITED STATES PATENT OFFICE.

STEPHEN J. WHITE AND VICTOR W. HUNTER, OF WELLAND, ONTARIO, CANADA.

COMBINATION HANDLE AND RUNNER ATTACHMENT FOR BABY CARRIAGES.

Application filed January 22, 1923. Serial No. 614,260.

*To all whom it may concern:*

Be it known that we, STEPHEN J. WHITE and VICTOR W. HUNTER, citizens of Canada, and residents of Welland, in the Province of Ontario and Dominion of Canada, have invented new and useful Improvements in Combination Handle and Runner Attachments for Baby Carriages, of which the following is a specification.

This invention relates generally to improvements in baby carriages but more particularly to a combination handle and runner attachment which enables the wheeled carriage to be readily converted into a sleigh, when desired.

One of the objects is to provide an attachment of this character which is simple in construction, which can be easily shifted from one position to the other for using the vehicle as a wheeled carriage or a sleigh, and which is applicable to carriages now in use as well as new ones.

Other features of the invention will be hereinafter described and particularly pointed out in the appended claims.

Figure 1:
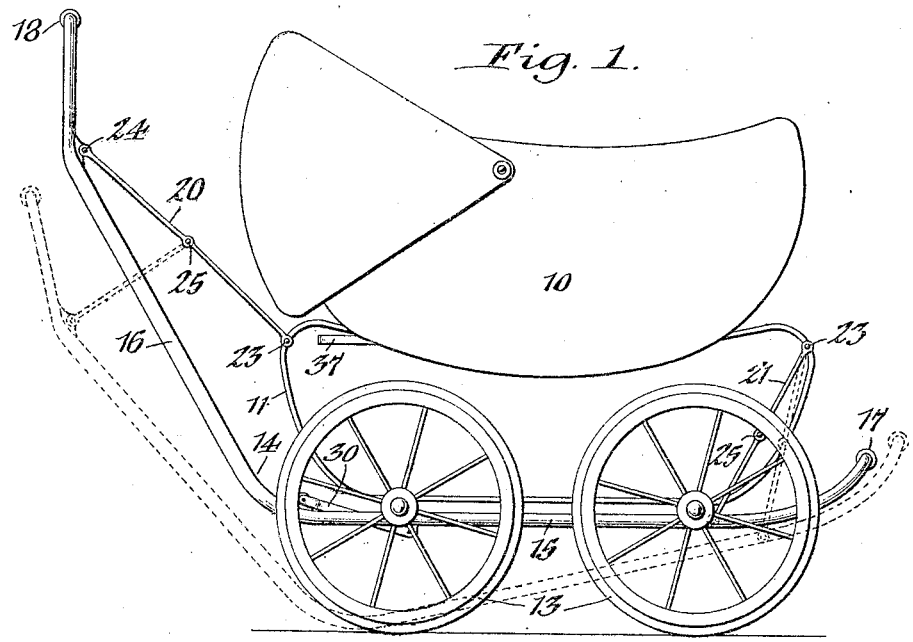
Figure 2:
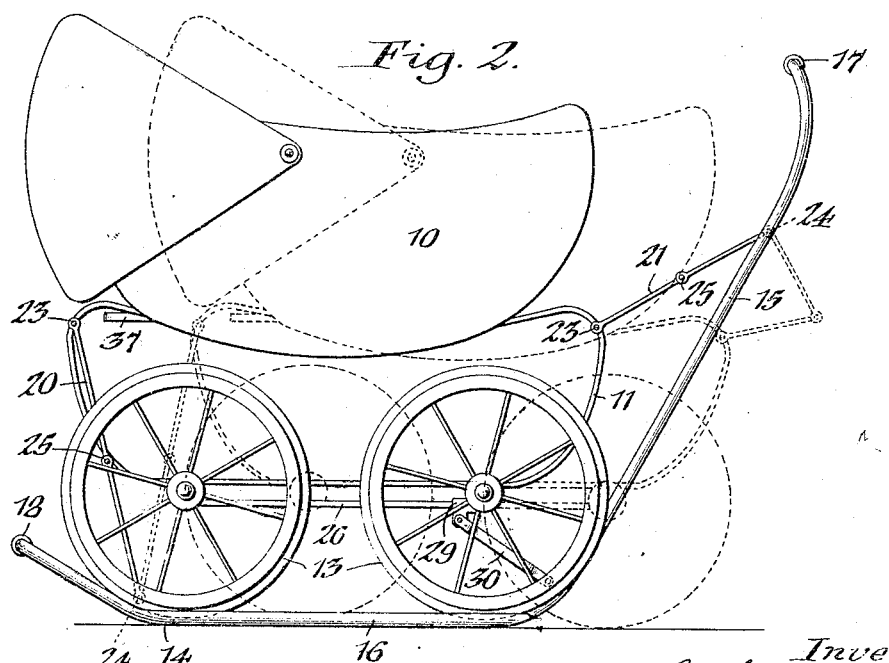

In the accompanying drawings: Figure 1 is a side elevation of a baby carriage showing our attachment adjusted to serve as a handle for the wheeled carriage. Figure 2 is a similar view, but showing the attachment adjusted to serve as a combined handle and sleigh runner. Figure 3 is a top plan view corresponding to Fig. 1, with the carriage body and spring omitted for clearness. Figure 4 is an enlarged fragmentary longitudinal section on line 4—4, Fig. 3. Figure 5 is a fragmentary view, similar to Fig. 4, showing the handle locked in the position shown in Fig. 2. Figure 6 is a transverse section on line 6—6, Fig. 5.

Similar characters of reference indicate corresponding parts throughout the several views.

In the drawings, the invention is shown in connection with one well known form of baby carriage or vehicle, but it will be understood that the invention is equally applicable to other forms, such as go-carts and the like.

10 indicates the body of the carriage, 11 the supporting frame or members consisting of the customary longitudinal springs to which the body is attached, 12 the axles, upon which the springs are mounted and 13 the supporting wheels.

The improved combination handle and runner attachment is designated generally by the reference numeral 14 and is connected to the carriage, so that it can be rocked from one end thereof to the other for converting the vehicle into a wheeled carriage or a sleigh. In its preferred construction, this attachment consists of an oblong frame bent into approximately L-shape and forming two handle sections which are adapted to be positioned alternately at opposite ends of the vehicle, depending on whether the latter is to be used as a wheeled carriage or a sleigh. One handle-section consists of a pair of longitudinal side bars 15, 15 and the other section consists of a pair of side bars 16, 16, coextensive and preferably integral with said first-named side bars, the outer ends of the two pairs of bars being rigidly connected by cross bars 17, 18, respectively, which form hand grips for pushing or pulling the vehicle. The side bars 16 also constitute sleigh runners and for this purpose are provided in their upper or inner sides with longitudinal grooves 19 for receiving and supporting the wheels of the carriage clear of the ground when the vehicle is to be used as a sleigh, as shown in Fig. 2 and in Fig. 5. In this case, the side bars 15 are located at the front of the carriage and serve as handles while, when the vehicle is used as a wheeled carriage, as shown in Fig. 1, the side bars or runners 16 are located at the back of the carriage and act as handles, the bars 15 being then located underneath the frame 11. The distance between the runner-bars 16 is substantially equal to the transverse distance between the carriage wheels, so that the grooves 19 are in alinement therewith, while the distance between the side bars 15 is sufficiently less, so that they may be positioned between the wheels without interfering therewith, as shown in Fig. 3.

The means for suspending the duplex handle attachment from the vehicle, so that it may be readily rocked or shifted from one position to the other without detaching it from the vehicle, preferably consist of two sets of links or straps 20, 21, located at either end of the carriage. One end of each link is pivoted at 23 to the adjacent body-supporting spring 11 or equivalent member of the vehicle, while its other end is pivoted at 24 to the opposing portion of the duplex handle. By preference, each link is composed of two sections hinged at 25 so that it is capable of folding and unfolding the necessary extent during the rocking movements of the handle attachment. It is to be understood, however, that these links may be made of flexible material, if desired, such for instance as leather. The links 20 at one end of the vehicle function as guides or stays to steady the handle when the vehicle is used as a wheeled carriage and to hold the wheels reliably in the grooves 19 of the runners 16 when the vehicle is converted into a sleigh. Similiarly, the links 21 at the other end of the vehicle serve as guides or stays to steady the handle when the vehicle is used as a sleigh and to hold the handle against the axles 12 when the vehicle is converted into a wheeled carriage. As shown in Figs. 1 and 2, the links 20 at one end of the carriage are somewhat longer than the links 21 at its opposite end, so that when the handle structure is shifted to one position or the other, these links function to properly guide said handle structure and insure its correct position relatively to the carriage.

26, 26 indicate horizontal guide rods arranged lengthwise of the vehicle and suitably supported at their ends in lugs 27 carried by the axles 12, as shown in Fig. 4. Movably mounted on these rods is a transverse slide or yoke 28 provided at its ends with depending collars 29 which loosely encircle said rods. Links 30 are pivoted at one end to the respective collars 29 and at their other ends to ears 31 formed on the duplex handle adjacent the junction of its side bars 15 and 16, so that when the handle is shifted in one direction or the other lengthwise of the vehicle, said slide is moved in a corresponding direction. The extent of movement of the slide is limited in either direction by its collars 29 abutting against the supporting lugs 27 of the guide rods 26. By this construction, the movement of the handle structure being operatively connected to the slide bar, is likewise limited in either direction.

Means are provided for positively holding or locking the handle attachment in either of its operative positions. For this purpose, locking devices preferably in the form of vertically-swinging latches 32, 33 are pivotally mounted on the axles 12, respectively, the latch 32 being adapted to interlock with the slide 28 to prevent longitudinal movement thereof, as shown in Fig. 5, while the latch 33 is adapted to interlock with a cross brace 34 on the duplex handle 14 to hold the latter up against the axles, as shown in Fig. 4. It will be observed that this brace is preferably located adjacent the junction of the side bars 15 and 16 with its central portion disposed between said bars 15. Each latch is provided with a spring 35 which tends constantly to hold it in its locked position. For releasing it, the latch is provided with a foot-piece or extension 36 which is within convenient reach of the user.

In the use of this reversible handle and sleigh-runner attachment, the change from baby-carriage to baby-sleigh is effected in the following manner:

Grasp the handle bar 18 with one hand, and unlock the latch 33 at the same end of the carriage, permitting the attachment to drop by gravity to the floor, as shown by dotted lines in Fig. 1. Then push forwardly on said handle bar and at the same time pull the carriage body through the medium of the hand grip 37 at the corresponding end thereof in the opposite direction with the other hand, causing the wheels to roll into the grooves 19 of the side bars or runners 16. Upon the completion of this forward movement of the attachment, the slide 28 will automatically interlock with the latch 32 at the opposite end of the carriage, as shown in Fig. 5, thus securely holding the attachment in the proper position for using the vehicle as a sleigh, as shown by full lines in Fig. 2. During this operation, the links 20 and 21 are doubled or folded, being again straightened by the time the duplex handle completes its movement. In this position of the parts, the links 30, in addition to their guiding function, serve to resist any tendency of the carriage to rise from the runners. The reversal of the attachment to convert the vehicle from a baby-sleigh into a baby-carriage is effected by grasping the handle bar 17, releasing the latch 32, pushing forward on said handle bar and pulling on the body of the carriage, the initial and final movements of this operation being shown by dotted lines in Figs. 2 and 1, respectively. The operator then steps to the opposite end of the carriage, grasps the handle bar 18 and lifts the attachment from the ground to the position shown by full lines in Fig. 1, in which it is locked by the automatic catch 33.

This improved duplex handle attachment is manifestly simple in construction and affords an economic means for readily converting the ordinary baby carriage into a sleigh when desired.

It is to be understood that we do not wish to be limited to the particular construction herein shown and described, since the invention is susceptible of modification without departing from its spirit as expressed in the appended claims.

We claim as our invention:

1. An attachment for baby-carriages and the like, comprising a handle, a part of said handle constituting sleigh runners arranged to pass under and support the wheels of the carriage.

2. An attachment for baby carriages and the like, comprising two connected handle sections arranged at an angle to each other, one of said sections forming sleigh runners arranged to receive and support the wheels of the carriage.

3. An attachment for baby carriages and the like, comprising an approximately L-shaped frame forming two handle sections, one of said sections including sleigh runners and provided with longitudinal grooves arranged to receive the wheels of the carriage.

4. An attachment for baby carriages and the like, comprising a handle consisting of side bars adapted to be suspended from the carriage to move lengthwise thereof, a portion of said bars constituting sleigh-runners adapted to receive the wheels of the carriage in one position thereof.

5. The combination with a baby carriage or the like, of a duplex-handle suspended from the carriage to move lengthwise thereof, each handle-section being adapted to be positioned alternately at oppositely ends of the carriage.

6. The combination with a baby-carriage or the like, of a duplex handle suspended from the carriage to move lengthwise thereof, the handle-sections being arranged at an angle to each other and each alternately movable to an operative position at opposite ends of the carriage.

7. The combination with a baby carriage or the like, of a duplex handle suspended from the carriage to move lengthwise thereof, the handle-sections being arranged at an angle to each other and each alternately movable to an operative position at opposite ends of the carriage, one of said handle-sections constituting sleigh runners arranged to pass under and receive the wheels of the carriage when the other handle section is in its operative position.

8. The combination with a baby carriage or the like, of a duplex handle having side bars suspended from the carriage to move lengthwise thereof, each handle section being adapted to be positioned alternately at opposite ends of the carriage, the side bars of one handle section constituting sleigh runners and being spaced to register with and receive the wheels of the carriage when the other handle section is in its operative position.

9. The combination with a baby carriage or the like, of a handle structure composed of two connected sections movable as a unit lengthwise of the carriage, each handle section being adapted to be positioned alternately at opposite ends of the carriage, and links connecting the end portions of the handle structure with the corresponding ends of the carriage, the links at one end of the carriage being longer than those at the opposite end.

10. The combination with a baby carriage or the like, of a handle-structure composed of two connected sections suspended from the carriage to move as a unit lengthwise thereof, each handle-section being adapted to be positioned alternately at opposite ends of the carriage and one of said sections constituting sleigh runners arranged to support the carriage wheels in one position of the handle-structure, a slide movable lengthwise of the carriage and operatively connected to said handle-structure, and locking means for said slide.

11. In combination with a baby carriage or the like, of a handle-structure composed of two connected sections suspended from the carriage to move as a unit lengthwise thereof, each handle section being adapted to be positioned alternately at opposite ends of the carriage, a slide movable lengthwise of the carriage and connected to said handle-structure, and locking devices mounted on the carriage near opposite ends thereof, one of said devices being arranged to interlock with said slide in one position of the handle-structure, and the other locking device being arranged to interlock with a part of said handle in its other position.

12. The combination with a baby-carriage or the like, of a reversible handle and runner-frame suspended from the carriage to move lengthwise thereof, said frame having hand grips at opposite ends and provided between its ends with runner-portions arranged in alinement with the carriage wheels and adapted to pass under and support them in one position of said frame and to clear the wheels in another position thereof.

13. The combination with a baby carriage or the like, of an approximately L-shaped handle structure consisting of spaced side bars arranged lengthwise of the carriage and forming two connected handle sections, the bars of one handle section constituting sleigh runners and having longitudinal grooves arranged in alinement with and adapted to receive the wheels of the carriage, a cross-brace connecting said side bars intermediate their ends, means for suspending said frame structure from the carriage to rock lengthwise thereof, whereby each handle section may be positioned alternately at opposite ends of the carriage, a slide mounted on the carriage to move lengthwise thereof, links pivotally connecting said slide with said handle structure, and means on the carriage for alternately interlocking with said cross brace and said slide for holding the handle sections in their respective operative positions.

STEPHEN J. WHITE.
VICTOR W. HUNTER.